Oct. 15, 1940.   C. S. BURDSAL   2,217,668
FLUID METER
Filed March 9, 1938   2 Sheets-Sheet 2
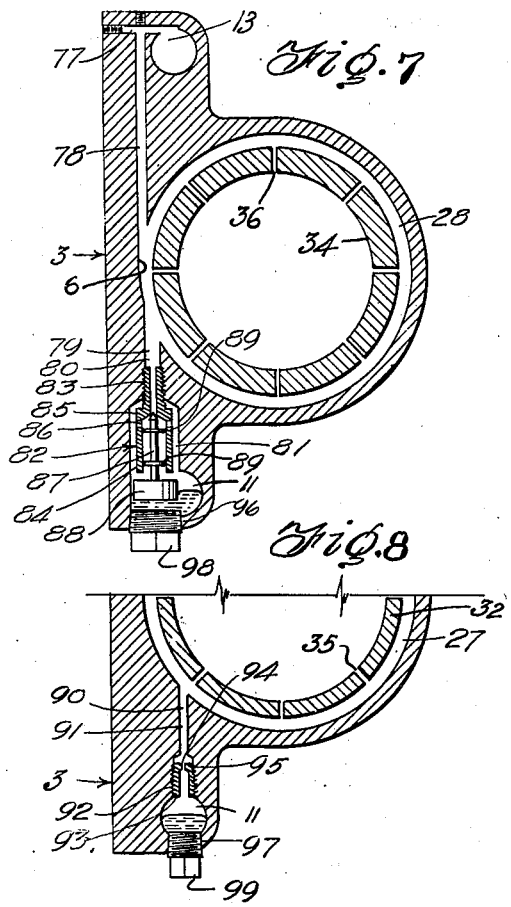
INVENTOR,
CHARLES S. BURDSAL,
BY
Kimmel & Crowell
ATTORNEYS.

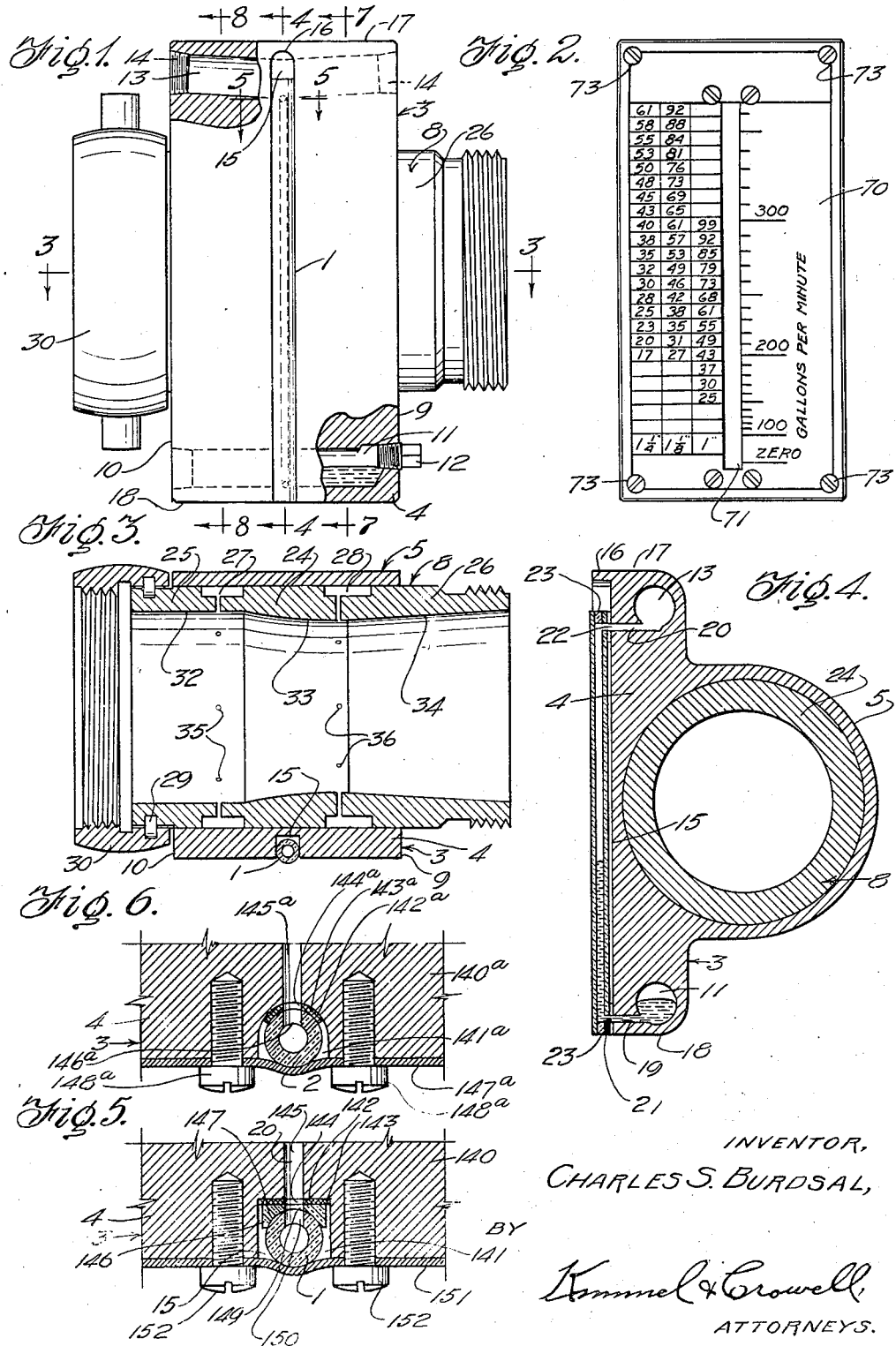

Patented Oct. 15, 1940

2,217,668

UNITED STATES PATENT OFFICE 2,217,668

FLUID METER

Charles Southard Burdsal, Cave Creek, Ariz.

Application March 9, 1938, Serial No. 194,956

2 Claims. (Cl. 73—31)

This invention relates to a meter structure designed primarily for use in connection with a fire fighting equipment including a pumping apparatus supplying liquid by a flexible hose line of variable length to a nozzle, but it is to be understood that a meter structure, in accordance with this invention is for use in any connection for which it may be found applicable, and the invention has for its object to provide, in a manner as hereinafter set forth, a meter structure for measuring nozzle pressure at the fire truck.

A further object of the invention is to provide, in a manner as hereinafter set forth, a meter structure for automatically indicating to an operator the flow of a fluid to determine whether or not the flow should be regulated.

A further object of the invention is to provide, in a manner as hereinafter set forth, a meter structure for the purpose referred to capable of being used on high pressure fire plugs.

A further object of the invention is to provide, in a manner as hereinafter set forth, a meter structure including means whereby no loss of the mercury (indicator) is had should there be in the meter structure too great a differential between the pressure from the venturi and the mercury.

A further object of the invention is to provide, in a manner as hereinafter set forth, a meter structure for the purpose referred to with a pair of mercury chambers, one normally containing the mercury and the other for receiving mercury should there be in the meter too great a differential between the pressure and the mercury.

Further objects of the invention are to provide, in a manner as hereinafter set forth, a meter structure for the purpose referred to which is simple in its construction, strong, durable, compact, readily installed with a water supply, thoroughly efficient when in use, and inexpensive to manufacture.

Embodying the foregoing aims and others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is an elevation partly in section looking towards that side of the meter structure to which is to have the indicia chart attached thereto, but with the chart omitted, Figure 2 is an elevation of the meter structure looking towards that side provided with the chart and with the Venturi tube omitted, Figure 3 is a section on line 3—3, Figure 1, Figure 4 is a section on line 4—4, Figure 1, Figure 5 is a section on line 5—5, Figure 1, Figure 6 is a sectional plan of a modified form of mounting for the mercury tube, Figure 7 is a section on line 7—7, Figure 1, and Figure 8 is a fragmentary section on line 8—8, Figure 1.

With respect to either form of the meter structure shown, each includes a manometer or mercury tube, the latter may be set up from glass, Celluloid or other transparent plastic material. When the tube is formed of glass, the ends thereof are sealed over and its body is provided with two spaced aligned openings formed therein by drilling. As to the tube formed of plastic material, the ends thereof are plugged and its body formed with spaced aligned openings located in the same manner as the openings in the glass tube. The openings in the tube are for establishing communication between the interior of the tube and a pair of mercury chambers. The tube shown in Figures 1, 3, 4 and 5 is indicated at 1, the tube shown in Figure 6 at 2. The tubes 1 and 2 may be of glass or plastic material.

With reference to Figures 1 to 5 and 7 and 8, the meter structure includes an upstanding support 3 formed of a rectangular front part or body 4 and a laterally disposed circular band-like rear part or body 5 integral with and disposed in lateral relation to the part 4. The latter is provided on its inner face intermediate its upper and lower ends with a horizontally disposed concave groove 6. The part 5 is integral with the rear face of part 4 and has its inner face form a continuation of the arc of the wall of groove 6. The band-like part 5 coacts with the groove to form a circular opening for the passage of a Venturi tube 8. The wall of the opening constitutes a holding means for the tube. The latter is of a length to extend laterally in opposite directions from the sides 9, 10 of the part 4.

There is formed within the part 4, in proximity to its lower end a transversely extending chamber 11 opening at the side 9 of part 4 and normally closed by a removable threaded plug 12. The chamber 11 constitutes a mercury reservoir. There is formed within the part 4, in proximity to its upper end a transversely extending chamber 13 opening at the sides of the part 4. The chamber 13 inclines downwardly from each end to its vertical center and has its ends normally closed by removable plugs 14. The chamber 13 constitutes a mercury receiving chamber into which the mercury is forced in the event there exists in the meter too great a differential between the pressure from the venturi and the mercury and thereby prevents loss of mercury. The manner in which the chambers communicate will be presently referred to.

The front face of part 4, centrally thereof is formed with a vertically disposed groove 15 which is closed at its upper end, as at 16, and open at its lower end. The closed end of groove 15 is positioned in proximity to the top 17 of part 4. The open end of groove 15 is at the bottom 18 of part 4. The latter in proximity to its bottom 18 is formed with a rearwardly extending port 19 which opens at one end into and centrally of the bottom of chamber 11 and at its other end into the groove 15. The part 4 in proximity to its top or upper end 17 is formed with a rearwardly extending port 20 which opens at one end into and centrally of the bottom of chamber 13 and at its other end into the groove 15.

Positioned within the groove 15 is the mercury tube 1 having spaced aligned openings in the body thereof indicated at 21, 22 which align with the ports 19, 20 respectively. The tube 1, as shown is of less length than groove 15, has its lower end flush with the bottom 18 of part 4, and is spaced from the base and side walls of the groove 15 by a means to be referred to. The upper and lower ends of the tube 1 are shown as being plugged as at 23, but the plugs are so arranged as not to interfere with the flow of mercury in opposite directions in the ports 19, 20. The openings 21, 22 in connection with the ports 19, 20 and openings in a means to be referred to establish communication between the tube 1 and the chambers 11, 13.

The Venturi tube 8 is formed of an intermediate portion 24 and a pair of end portions 25, 26. The portion 24 has its outer face, adjacent its ends provided with a pair of spaced circumferentially extending annular grooves 27, 28 which are closed by the wall of the opening through which the tube 8 extends to provide annular spaces having their outer walls imperforate. The space which the groove 27 forms is termed a rear annular space and the space which groove 28 forms is termed a front annular space. The end portion 25 is grooved in its outer face to receive a connector 29 for revolubly attaching to such portion an interiorly threaded coupling collar 30 employed for attaching the tube to a supply of water under pressure. The end portion 26 is peripherally threaded for attaching thereto a coupler, not shown, employed for connecting the tube to a water conducting off line, not shown. The inner face of the tube includes an inner end portion 32 of uniform diameter, an intermediate portion 33 substantially of compound curvature in lengthwise section and of frusto-tapered contour lengthwise and an outer end portion 34 which gradually increases in diameter throughout from the leading end of portion 33. The portion 33 is termed a throat and its contour overcomes the so-called "vena contracta" which is ordinarily experienced in Venturi construction. The tube 8 is formed with a rear circular row of spaced ports 35 which lead from the interior of the tube to the groove 27. The tube 8 is formed with a forward circular row of spaced ports 36 which lead from the interior of the tube to the groove 28. The ports 35 are formed in the body of the Venturi tube 8 between the vertical median and forward end of inner face portion 32 of the tube. The ports 36 are formed in the body of the Venturi tube 8 at a point between the vertical median and forward end of the inner face portion 34 of the tube.

Supported upon the front face of the part 4 is a carrier or chart 70 provided with suitable indicia of the indicating type which is associated with and selectable by a column of mercury rising and lowering in tube 1. The carrier or chart 70 is in the form of an etched brass plated metallic plate painted to form a contrast with the indicia thereon. The mercury column constitutes an indicator. The carrier or chart 70 has a vertically disposed central slot 71 to provide for one viewing the indicator with respect to the selected indicia. The tube 1 aligns with the slot 71 of the carrier 70. The chart 70 is anchored to carrier 3 by the holdfast means 73. The chart 70 has indicia indicating nozzle pressure and rate of flow.

Leading outwardly from the top of chamber 13 is a horizontally disposed port 77 which opens into the upper end of a vertically disposed channel 78 leading from the top of the inner side of groove 28. Extending downwardly from the bottom of the inner side of groove 28 is a channel 79 which opens at its lower end into the top of chamber 11. The channel 79 has an upper reduced portion 80 and an enlarged lower portion 81. Arranged in the channel 79 is a valve structure to provide for automatic mercury return. The said valve structure is in the form of a tubular combined guide and valve seat forming element 82, suspended within channel 79 intermediate the ends of the latter. The element 82 is formed with a reduced peripherally threaded upper part 83 and an enlarged lower part 84. The part 83 threadedly engages with the wall of the upper portion 80 of channel 79 and suspends the said part 84 in and spaced from the wall of the lower portion 81 of channel 79. The inner face of the upper end of part 84 is of a contour to form a valve seat 85. The said part 84 in proximity to its upper end is formed with openings 86. Slidably relative to the element 82 and extending upwardly in the said part 84 of the latter is a float controlled needle valve 87 for coaction with said seat 85 to shut off communication between the portion 80 of channel 79 and the chamber 11. The lower end of valve 87 is fixed to a float 88 controlled by the level of the mercury in the chamber 11. Carried by the valve 87 are guide discs 89 which ride against the inner face of the part 84 of element 82 for centering the valve 87 relative to its seat 85.

The carrier 3 is formed with a channel 90 which leads downwardly from the groove 27 towards and opens into the top of the mercury compartment 11. The channel 90 has a reduced upper portion 91 and an enlarged lower portion 92. Secured in the latter is a restriction means in the form of an inverted cup-shaped member 93 having an opening, port or orifice 94 centrally of its top 95. The chamber 11 is formed with threaded openings 96, 97 in its bottom which are closed by removable threaded plugs 98, 99 respectively. The chamber or reservoir 11 is large compared to tube 1, so that the mercury normally falls only a small amount in such chamber or reservoir.

With reference to Figure 5 a form of mounting is shown for clamping the mercury tube 1 in position. The support for the mercury tube is indicated at 140 and has its front face formed with a groove 141 having a flat base wall 142. Positioned against the wall 142 is a compressible packing 143 formed with spaced openings 144 for registering with the ports 145 leading from the chambers forming the mercury reservoir and the mercury receiver. Against the packing 143 is arranged a saddle 146 formed in its outer face with a concave groove 147 in which is positioned the mercury tube 1. The saddle 146 spaces tube 1 from the walls of the groove 141 and is formed with spaced openings 149 which register with the openings 144 and the spaced openings 150 formed in the tube 1. Only one of the openings 144, ports 145, openings 149 and openings 150 are shown. The chart indicated at 151 is secured to the outer face of support 140 by the holdfast means 152 and extends across the tube 1. The chart 151 is transparent.

With reference to Figure 6 another form of mounting is shown for clamping the mercury tube 2 in position. The support for the tube is indicated at 140a and has its front face provided with a groove 141a having its base wall 142a of segmental cross section. Positioned against the wall 142a is a compressible packing 143a formed with spaced openings 144a for registering with the ports 145a which establish communication between the chambers forming the mercury reservoir and mercury receiver and the openings 146a in the body of the tube. The packing 143a spaces tube 2 from the walls of groove 141a. Only one of the openings 144a, one of the ports 145a and one of the openings 146a are shown. The tube 1 is positioned in groove 141a and seats against the packing 143a. The chart indicated at 147a is secured to the outer face of support 140a by the holdfast means 148a and extends across the tube 1. The chart 147a is transparent.

The orifice 94 will prevent surges of any type from occurring in the mercury by merely limiting the flow either way through the line wherein it is located. If same were removed and operation attempted, an unfavorable result would occur, as upon a sudden rush of water through meter exceeding the maximum limit would cause the mercury to hit chamber 13 at high velocity breaking same up into small globules. These would be jetted out of chamber by the high velocity water that followed and be deposited in groove 28 or carried out the hose, rendering meter inoperative until refilled.

The body 4 is formed of Monel metal which will not amalgamate with the mercury.

What I claim is:

1. In a fluid water, an upstanding structure provided therein at its upper and lower portions respectively with a mercury receiving chamber and a mercury reservoir, an upstanding manometer tube mounted in said structure adjacent said chambers, sealed at its ends and of less diameter than the diameter of said chambers, said tube and said structure having coacting means for permanently establishing communication between spaced points of said tube and said chamber and reservoir, said structure being formed respectively with a hydraulic pressure conducting channel leading from a source of hydraulic pressure to said chamber and a hydraulic pressure conducting channel leading from said source to said reservoir, said channels communicating with each other, that channel leading to the mercury reservoir having upper and lower portions and with the lower portion of greater diameter than the upper portion, an automatic mercury return valve structure having a part thereof secured in said upper portion and its remaining part arranged in said lower part and mercury reservoir, a hydraulic pressure operated indicator formed from a part of a body of mercury normally housed in said reservoir and forced up said tube until its height equals the differential of pressure, the mercury in the reservoir as the indicator rises falling only a minute amount due to the difference in area of the two surfaces of mercury and on the presence of a too great differential the mercury passes into said chamber, a carrier anchored to said structure and provided with means for exposing said indicator, said carrier being formed with indicia calibrated in nozzle pressure, said calibrations arranged relative to and selectable by said indicator for reading, said structure being formed with another hydraulic pressure conducting channel leading from said source to said reservoir, and a restriction element mounted in said last mentioned channel at the point of communication of the latter with said reservoir.

2. In a fluid meter, an upstanding structure provided therein at its upper and lower portions respectively with a mercury receiving chamber and a mercury reservoir, an upstanding manometer tube mounted in said structure adjacent said chamber, sealed at its ends and of less diameter than the diameter of said chambers, said tube and said structure having coacting means for permanently establishing communication between spaced points of said tube and said chamber and reservoir, said structure being formed with an upper hydraulic pressure conducting channel leading from a source of hydraulic pressure and opening into the top of said chamber, said structure being formed with a lower hydraulic pressure conducting channel leading from said source and opening into the top of said reservoir, said channels communicating with each other, said lower channel having upper and lower parts, said lower part being of greater diameter than said upper part and opening into said reservoir, an automatically operable mercury return valve structure having a portion secured in said upper part and its remaining portion extending through said lower part into said reservoir, a hydraulic pressure operated indicator formed from a part of a body of mercury normally housed in said reservoir and forced up said tube until its height equals the differential of pressure, the mercury in the reservoir as the indicator rises falling only a minute amount due to the differences in area of the two surfaces of mercury and on the presence of a too great differential the mercury passes into said chamber, a carrier anchored to said structure for exposing said indicator, said carrier being formed with indicia calibrated in nozzle pressure, said calibrations arranged relative to and selectable by said indicator for reading, said structure being formed with another hydraulic pressure conducting channel leading from said source to said reservoir, and a restriction element mounted in said last mentioned channel at the point of communication of the latter with said reservoir.

CHARLES SOUTHARD BURDSAL.